United States Patent Office 2,798,082
Patented July 2, 1957

2,798,082

Δ²²-11-OXYGENATED-STEROIDS AND PROCESS OF PREPARING THEM

John M. Chemerda and Erwin F. Schoenewaldt, Metuchen, N. J., assignors to Merck & Co., Inc., Rahway, N. J., a corporation of New Jersey No Drawing. Application December 26, 1951,
Serial No. 263,476

7 Claims. (Cl. 260—397.2)

This invention is concerned generally with nuclearly saturated steroid compounds having an oxygen atom attached to the carbon atom in the 11-position of the molecule, and with processes for preparing these 11-oxygenated steroid compounds. More particularly, it relates to novel 11-keto-cyclopentanoperhydrophenanthrene compounds of the natural sterol and sapogenin series, and of degradation products thereof, and to the novel processes of preparing said 11 - keto - cyclopentanoperhydrophenanthrene compounds starting with the corresponding Δ⁸-11-keto-cyclopentanopolyhydrophenantherne compounds. The 11-keto-cyclopentanoperhydrophenanthrene compounds prepared in accordance with our novel procedure are valuable as intermediates in the synthesis of other steroid compounds having an oxygen atom attached to the 11-carbon atom such as corticosterone, cortisone and compound F utilizing the methods described in the following articles: Journal of the American Chemical Society, volume 73, pages 2396–7 and 4052–3, and Nature, volume 168, page 28.

The 11-keto-cyclopentanoperhydrophenanthrene compounds, subject of the present invention, have at rings B and C the following chemical structure:

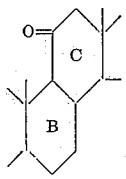

These 11-keto-cyclopentanoperhydrophenanthrene compounds are prepared, in accordance with our novel procedure, by reacting a Δ⁸-11 - keto - cyclopentanopolyhydrophenanthrene compound (Compound 1 hereinbelow) with a reducing agent thereby forming the corresponding 11-hydroxy - cyclopentanoperhydrophenanthrene compound (Compound 2) and/or the desired 11-keto-cyclopentanoperhydrophenanthrene compound (Compound 3). The 11 - hydroxy - cyclopentanoperhydrophenanthrene compound (when formed) can be converted, by reaction with an oxidizing agent, to the desired 11-keto-cyclopentanoperhydrophenanthrene compound (Compound 3). Where the reducing agent employed is an alkali metal and the reaction is carried out by bringing the reactants together in a medium consisting of a lower alkanol, or in a medium comprising liquid ammonia substantially free of alcoholic solvents, the Δ⁸-cyclopentanopolyhydrophenanthrene compound is converted essentially to the desired 11-keto-cyclopentanoperhydrophenanthrene compound substantially uncontaminated by any of the corresponding 11-hydroxy-cyclopentanoperhydrophenanthrene compound.

The reactions indicated hereinabove may be chemically represented, insofar as the changes taking place in rings B and C are concerned, as follows:

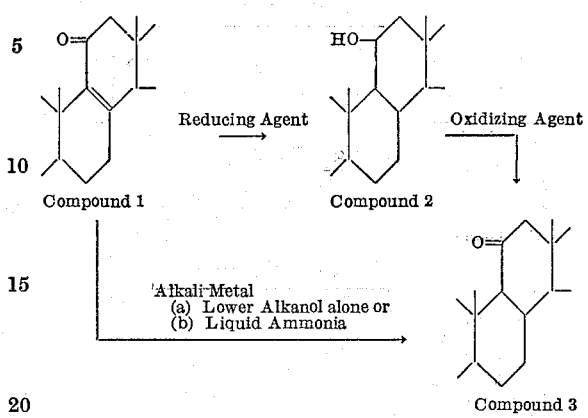

The Δ⁸-11 - keto - cyclopentanopolyhydrophenanthrene compounds which we ordinarily employ as starting materials in carrying out the presently invented process are those having a steroil side chain attached to the carbon atom in the 17-position of the molecule such as Δ⁸,²²-11-keto-ergostadiene, Δ⁸,²²-3-acyloxy-keto-ergostadiene, Δ⁸,²²-3-acetoxy-11-keto-ergostadiene, Δ⁸-3-acyloxy-11-keto-cholestene, Δ⁸-3-acetoxy-11-keto-cholestene, Δ⁸-3-hydroxy-11-keto-cholestene, Δ⁸,²²-3-acyloxy - 11 - keto-stigmastadiene, Δ⁸,²²-3-acetoxy - 11-keto-stigmastadiene, Δ⁸,²²-3-hydroxy-11-keto - stigmastadiene, Δ⁸-3-acyloxy - 11-keto - cholenic acid, Δ⁸-3-acetoxy-11-keto-cholenic acid, Δ⁸-3-hydroxy-11-keto-cholenic acid, Δ⁸-3-acyloxy - 11 - keto-bisnorallocholenic acid, Δ⁸-3-acetoxy-11-keto-bisnorallocholenic acid, Δ⁸-3-hydroxy-11-keto-bisnorallocholenic acid, Δ⁸-3-acyloxy-11,20 - diketo - allopregnene, Δ⁸ - 3 - acetoxy-11,20-diketo-allopregnene, Δ⁸-3-hydroxy-11,20 - diketo-allopregnene, Δ⁸-11-keto-dehydrotigogenin acylate, Δ⁸-11-keto-dehydrotigogenin-acetate, Δ⁸-11 - keto - dehydrotigogenin, and the like.

In preparing these Δ⁸-11-keto-cyclopentanopolyhydrophenanthrene compounds, utilized as starting materials in my procedure, we ordinarily start with the corresponding Δ⁷,⁽⁹⁾¹¹ - cyclopentanopolyhydrophenanthrene compounds, certain of which, such as ergosterol-D and 3-acyloxy derivatives thereof, are described in the prior art. Other Δ⁷,⁽⁹⁾¹¹ - cyclopentanopolyhydrophenanthrene compounds can be prepared starting with readily available Δ⁵-cyclopentanopolyhydrophenanthrene compounds such as cholestene, by treating the Δ⁵-cyclopentanopolyhydrophenanthrene compound (Compound 4 hereinbelow) with N-bromosuccinimide, reacting the resulting Δ⁵-7-bromo-cyclopentanopolyhydrophenanthrene compound (Compound 5) with a tertiary amine to form the corresponding Δ⁵,⁷-cyclopentanopolyhydrophenanthrene compound (Compound 6), reacting this compound with hydrogen in the presence of Raney nickel catalyst thereby selectively reducing the unsaturated linkage attached to the carbon atom in the 5-position to form the corresponding Δ⁷-cyclopentanopolyhydrophenanthrene compound (Compound 7), and bringing said Δ⁷-cyclopentanopolyhydrophenanthrene compound into intimate contact with a solution of mercuric acetate in acetic acid thereby producing the corresponding Δ⁷,⁹⁽¹¹⁾ - cyclopentanopolyhydrophenanthrene compound (Compound 8). The reactions indicated hereinabove may be chemically represented (insofar as the changes taking place in rings B and C are concerned) as follows:

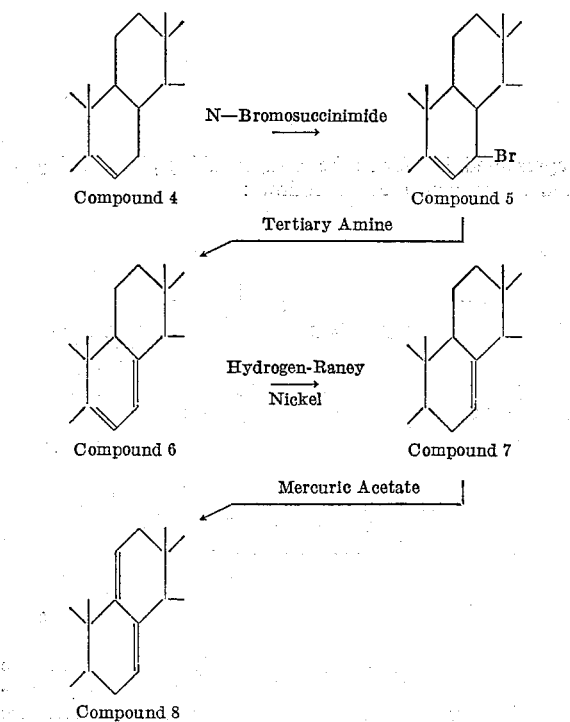

The $\Delta^{7,(9)11}$-cyclopentanopoylhydrophenanthrene compound thus obtained is converted to the corresponding $\Delta^8$-11-keto-cyclopentanopolyhydrophenanthrene compound (Compound 1 hereinbelow) utilized as starting material in carrying out our process as follows: the $\Delta^{7,9(11)}$-cyclopentanopolyhydrophenanthrene compound (Compound 8) is reacted with perbenzoic acid thus forming the epoxide of the $\Delta^{7,9(11)}$-cyclopentanopolyhydrophenanthrene compound which is then reacted with boron trifluoride in an anhydrous solvent (preferably by adding the boron trifluoride in the form of its ether complex to a solution of the epoxide of the $\Delta^{7,9(11)}$-cyclopentanopolyhydrophenanthrene compound in anhydrous diethyl ether) thereby producing the corresponding $\Delta^8$-11-keto-cyclopentanopolyhydrophenanthrene compound (Compound 1). The foregoing reactions may be chemically represented (insofar as the chemical changes occurring in rings B and C are concerned) as follows:

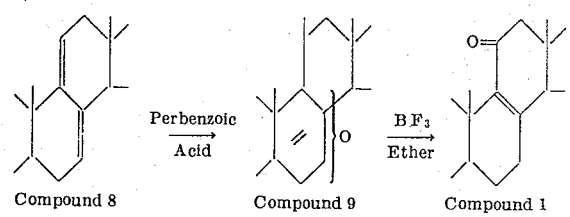

In accordance with the presently invented process, the $\Delta^8$-11-keto-cyclopentanopolyhydrophenanthrene compound, utilized as the starting material therein, is reacted with a reducing agent thereby reducing the double bond connecting the carbon atoms in the 8- and 9-positions of the molecule to form the corresponding nuclearly saturated 11-oxygenated cyclopenthanoperhydrophenanthrene compound. We ordinarily employ a metallic reducing agent in conducting my novel procedure, as for example, an alkali metal, such as metallic sodium, metallic potassium, or metallic lithium, or a mercury amalgam of an alkali metal, or an alkaline earth metal such as metallic calcium, or metallic zinc, and the like. When an alkali metal or an alkaline earth metal is utilized as the reducing agent, the reaction is conveniently carried out in a medium comprising a lower alkanol such as methanol, ethanol, propanol, isopropanol, butanol, amyl alcohol, and the like, or in a medium comprising liquid ammonia. Where an alkali metal is employed as the reducing agent, the lower alkanol can be used, if desired, as the sole liquid component of the liquid medium or can be used in an admixture with liquid ammonia and/or an inert neutral solvent, for example, a hydrocarbon solvent such as benzene, toluene, or petroleum ether, or an ethereal solvent such as diethyl ether, and the like. Where an alkaline earth metal is utilized as the reducing agent, the reaction is likewise conducted in a liquid medium comprising solely lower alkanol or the lower alkanol may contain liquid ammonia and/or a hydrocarbon solvent and/or ether admixed therewith, if desired. Alternatively, when an alkali or alkaline earth metal is employed as the reducing agent, liquid ammonia may be used as the sole liquid component, or ether admixed therewith. Where metallic zinc is employed as the reducing agent, it is ordinarily preferred to use a liquid medium comprising a lower alkanol together with a concentrated aqueous solution of a mineral acid such as concentrated aqueous hydrochloric acid. Where a mercury amalgam of an alkali metal is used as the reducing agent, the reaction is conducted in a liquid medium comprising a lower alkanol alone or admixed with a hydrocarbon solvent and/or ether.

We ordinarily prefer to utilize metallic sodium or metallic lithium as the reducing agent and to carry out the reduction operation in a liquid medium comprising ethanol alone, or liquid ammonia alone, or in a medium comprising ethanol and liquid ammonia; and we have found that best results are obtained utilizing an excess of the metallic reducing agent, whereby the $\Delta^8$-11-keto-cyclopentanopolyhydrophenanthrene compound is reduced to the corresponding 11-keto-cyclopentanoperhydrophenanthrene compound, or the corresponding 11-hydroxy-cyclopentanoperhydrophenanthrene compound, the extent of reduction being dependent on the liquid medium employed. As noted hereinabove, where an alkali metal is employed as the reducing agent and the reaction medium consists of a lower alkanol alone, or where the reaction medium comprises liquid ammonia substantially free of alcoholic solvent, the $\Delta^8$-11-keto-cyclopentanopolyhydrophenanthrene compound is reduced essentially to the corresponding 11-keto-cyclopentanoperhydrophenanthrene compound.

As set forth hereinabove, in addition to the lower alkanol component and/or the liquid ammonia component of the liquid medium, we ordinarily employ an inert neutral solvent in conjunction therewith. The $\Delta^8$-11-keto-cyclopentanopolyhydrophenanthrene compound is conveniently dissolved in the latter solvent (i. e., benzene, toluene, petroleum ether, diethyl ether and the like) and the resulting solution mixed with the lower alkanol and/or the liquid ammonia. Although it is possible to carry out the reduction action using the lower alkanol or the liquid ammonia as the sole solvent, or employing a liquid medium consisting solely of the lower alkanol admixed with liquid ammonia, we prefer to use the inert neutral solvent as a component of the medium since it is thus possible to obtain a more workable reaction mixture and to keep the steroid reactants and product in solution.

Where the reduction reaction is carried out using an alkaline earth metal or an alkali metal such as metallic sodium in a liquid medium comprising ethanol as the sole solvent, or ethanol in conjunction with an inert reaction solvent as described hereinabove, the reaction is preferably conducted at an elevated temperature of about 40–70° C. and for a period of time ranging from about 2 to 3 hours, or longer if desired. Where an amalgam of an alkali metal, e. g. sodium amalgam, is utilized in conjunction with a lower alkanol or a lower alkanol admixed with an inert neutral solvent, the reaction is likewise conducted at a temperature of about 25–50° C. and for a period of time in excess of about 2 hours. Where metallic zinc in conjunction with a mineral acid is used as the reducing agent, the temperature of the reaction is maintained within the range of about 40–70° C., under which conditions the reaction is ordinarily complete in a period of about 2 to 3 hours. If preferred, all of the foregoing reaction procedures can be conducted at somewhat higher temperatures than those set forth hereinabove.

When a liquid medium comprising a lower alkanol admixed with liquid ammonia is utilized, the reduction operation is carried out at a temperature of about —40° C., preferably utilizing metallic sodium or metallic lithium as the metallic reducing agent, and ethanol as the lower alkanol. When a liquid medium consisting of liquid ammonia as the sole component or liquid ammonia admixed with an ethereal solvent is used, the reduction medium is also carried out at a temperature of about —40° to —50° C., preferably with metallic lithium as the reducing agent. When this procedure is employed, a lower alkanol such as ethanol, or an easily reducible non-acidic substance such as an ester, i. e., ethyl acetate, is added at the end of the reaction time to destroy any excess alkali metal present. Under these preferred conditions, the time factor does not appear critical, but the reduction reaction is ordinarily run for a period of about one-half to three hours in order to insure completeness of the reaction. Where lithium metal is used as the reducing agent in conjunction with a medium comprising liquid ammonia free of alcohol solvents, we prefer to conduct the reaction for a period of time up to 20 to 24 hours.

The 11-oxygenated cyclopentanoperhydrophenanthrene compounds obtained in accordance with the foregoing reduction procedure include: $\Delta^{22}$-11-hydroxy-ergostene, $\Delta^{22}$-1-ketoergostene, $\Delta^{22}$-3,11-dihydroxy-ergostene; $\Delta^{22}$-3-hydroxy-11-keto-ergostene, 3,11-dihydroxy-cholestane, 3-hydroxy-11-ketocholestane, $\Delta^{22}$-3,11-dihydroxy-stigmastene, $\Delta^{22}$-3-hydroxy-11-keto-stigmastene, 3,11-dihydroxy-cholanic acid, 3-hydroxy-11-keto-cholanic acid, 3,-11-dihydroxy-bisnorallocholanic acid, 3-hydroxy-11-keto-bisnorallocholanic acid, 3,11,20-trihydroxy-allopregnane, 3-hydroxy-11,20-diketo-allopregnane, 11-hydroxy-tigogenin, 11-keto-tigogenin, and the like.

Where the 11-oxygenated cyclopentanoperhydrophenanthrene compound obtained in accordance with the foregoing reduction procedure contains a hydroxyl radical attached to the 11-carbon atom, we ordinarily prefer to react this 11-hydroxy-cyclopentanoperhydrophenanthrene compound with an oxidizing agent such as chromic acid whereby the 11-hydroxy substituent is oxidized to a keto radical, thereby producing the corresponding 11-keto-cyclopentanoperhydrophenanthrene compound. Where other hydroxy groupings are present in the steroid molecule, as for example a 3-hydroxy substituent, these hydroxy groupings may likewise be oxidized to ketone substituents by utilizing an excess of oxidizing agent. The oxidation reaction is conveniently carried out in a liquid medium comprising a non-oxidizable organic solvent. Where chromic acid is used as the oxidizing agent, we prefer to use acetone or glacial acetic acid such as the liquid medium for the oxidation reaction.

The 11-keto-cyclopentanoperhydrophenanthrene compounds which are obtained in accordance with this procedure include: $\Delta^{22}$-11-keto-ergostene, $\Delta^{22}$-3,11-diketo-ergostene, 3,11-diketo-cholestane, $\Delta^{22}$-3,11-diketo-stigmastene, 3,11-diketo-cholanic acid, 3,11-diketo-bisnorallocholanic acid, 3,1,20-triketo-allopregnane, 3,11-diketo-tigogenin, and the like.

The following examples illustrate methods of carrying out the present invention, but it is to be understood that these examples are given for purposes of illustration and not of limitation.

*Example 1*

Five hundred milligrams of $\Delta^{8,22}$-3-acetoxy-11-keto-ergostadiene was dissolved in 25 cc. of boiling absolute ethanol, and to the resulting solution was added 1.5 g. of metallic sodium. The resulting mixture was heated under reflux for a period of approximately 2 hours, and the reaction mixture was diluted with water. The gummy material which precipitated was recovered, and crystallization was induced by trituration with methanol. The crystalline material was then dried and was found to possess λ max. at 2590 A. E% 85 which indicated that reduction had occurred to the extent of about 50–60% of theory. The crude material was chromatographed over alumina, and the methanol eluate was concentrated to dryness to give substantially pure $\Delta^{22}$-3-hydroxy-11-keto-ergostene; M. P. 165–170° C.

*Example 2*

One gram of $\Delta^{8,22}$-3-acetoxy-11-keto-ergostadiene was dissolved in a mixture of 17 cc. of anhydrous ether and 75 cc. of liquid ammonia while maintaining the temperature of the solution at about —40° C. Two-tenths gram of metallic lithium was added, with stirring, to the liquid ammonia solution. The resulting mixture was allowed to stand for a period of about 5 minutes. Two cubic centimeters of ethanol was added followed by 0.1 g. of metallic lithium, and the mixture was allowed to stand for an additional period of thirty minutes. The resulting mixture was allowed to warm to room temperature, and the ammonia and ether were evaporated from the solution. The residual material was digested with 10 cc. of ethanol to dissolve any unreacted lithium metal. The resulting mixture was then diluted with ether and the ethereal solution was filtered, washed with water, then with aqueous acetic acid, and finally with aqueous sodium bicarbonate solution. The ethereal extract was then dried, and the ether evaporated therefrom to give approximately 400 mg. of crude $\Delta^{22}$-3,11-dihydroxy-ergostene.

The latter product was dissolved in 10 cc. of acetone, and to this solution was added a solution containing 100 mg. of chromium trioxide dissolved in one cubic centimeter of 10% aqueous sulfuric acid solution. The resulting mixture was allowed to stand at approximately room temperature for a period of about 1 hour, the reaction mixture was diluted with water, and the crystalline product which separated was recovered by filtration to give crude $\Delta^{22}$-3,11-diketo-ergostene. This material was purified by recrystallization from methanol to give substantially pure $\Delta^{22}$-3,11-diketo-ergostene; M. P. 162–163.5° C.

$$\alpha_D^{25°\,C.} = +38° \text{ (in chloroform)}$$

*Example 3*

Five grams of $\Delta^{8,22}$-3-acetoxy-11-keto-ergostadiene was dissolved in 35 cc. of ether, and the resulting solution was added to a solution of 20 cc. of ethanol in 250 cc. of liquid ammonia while maintaining the temperature of the resulting solution at about —40° C. One and five-tenths grams of metallic lithium was added, with stirring, to the liquid ammonia solution while maintaining the temperature of the resulting mixture at about —40° C. The resulting solution was allowed to stand at that temperature of —40° C. for a period of approximately 1 hour. The reaction mixture was warmed to about room temperature thereby evaporating the ammonia from the solution. The residual material was extracted with ether and the ethereal extract was filtered. The filtered ethereal solution was washed first with water, then with saturated aqueous sodium chloride solution, and the washed ethereal solution was dried. The ether was evaporated from the dry ethereal solution to give 4 g. of a crystalline residue which consisted primarily of $\Delta^{22}$-3,11-dihydroxy-ergostene admixed with a minor amount of $\Delta^{22}$-3-acetoxy-11-hydroxy-ergostene.

The mixture of $\Delta^{22}$-3,11-dihydroxy-ergostene and its 3-acetate (4 g., prepared as described above) was dissolved in 125 cc. of acetone, and a solution containing 1 g. of chromium trioxide dissolved in 6 cc. of water was added to the acetone solution. The resulting mixture was allowed to stand at a temperature of about 25° C. for a period of about 1 hour. The reaction solution was diluted with water whereupon a crystalline product separated and was recovered by filtration and dried to give a crude product; M. P. 138–142° C. This material was purified by chromatography over alumina, and the alumina absorbate was eluated, first with a solvent consisting of equal parts of diethyl ether and petroleum ether, and then with diethyl ether. Evaporation of the diethyl ether-petroleum ether eluate gave substantially sure $\Delta^{22}$-3,11-diketo-ergostene, $$\alpha_D^{25°\,C.} = +38° \text{ (in chloroform)}$$

Evaporation of the diethyl ether eluate gave substantially pure $\Delta^{22}$ - 3 - hydroxy - 11 - keto - ergostene; M. P. 167.5–168.5° C.

Example 4

Five grams of metallic sodium in small chunks was added, with stirring, to a solution containing 5 g. of $\Delta^{8,22}$-3-acetoxy-11-keto-ergostadiene dissolved in 300 ml. of liquid ammonia and 35 cc. of ether, while maintaining the temperature of the resulting mixture at about —40° C. Twenty milliliters of ethanol was added to the resulting mixture, dropwise, over a 20 minute period following which 20 ml. of additional ethanol was added more rapidly. Five minutes after all of the ethanol had been added, the reaction mixture was substantially colorless. The reaction mixture was then diluted with water, and the aqueous mixture was extracted with ether. The ethereal extract was washed with water, dried and the ether evaporated therefrom to give 5.02 g. of crude product which was purified by recrystallization from methanol to give substantially pure $\Delta^{22}$-3,11-dihydroxy-ergostene which was obtained in the form of white crystals; M. P. 155–158° C.; λmax. 2570 A. E% 19.8.

Example 5

Five grams of mercury were added to 5 g. of molten sodium while maintaining a nitrogen atmosphere over the mixture. The resulting fluid amalgam was cooled, and 50 ml. of petroleum ether was added thereto. To the resulting solution was added a solution containing 1 g. of $\Delta^{8,22}$-3-acetoxy-11-keto-ergostadiene dissolved in 200 ml. of petroleum ether and, with vigorous stirring, 12.5 ml. of ethanol was added to the mixture. The resulting mixture was stirred for approximately 3 hours, and was then allowed to stand for a period of about 60 hours. Thirty milliliters of ethanol were then added to the reaction mixture thereby decomposing excess sodium metal. The reaction mixture was filtered through a sintered glass filter, and the clear ethereal solution was washed thoroughly with water, and the solvents were evaporated therefrom in vacuo to give a white solid product. This material was recrystallized from aqueous methanol, and the white material thus obtained (M. P. 152.5–155° C.) was dissolved in hot methanol. Upon rapidly cooling this methanol solution, a small amount of material crystallized and was recovered by filtration and dried to give an impure product (M. P. 149–150.5° C.) Upon evaporation of the methanolic mother liquors, and recrystallization of the residual material from ethanol there was obtained a different isomer of $\Delta^{22}$-3,11-dihydroxy-ergostene; M. P. 202–205° C.

*Analysis.*—Calc'd for $C_{28}H_{48}O_2$: C, 80.71; H, 11.57. Found: C, 80.63; H, 11.32.

Example 6

Twelve grams of zinc dust were added to a solution containing 3 g. of $\Delta^{8,22}$-3-acetoxy-11-keto-ergostadiene in 125 ml. of absolute ethanol. The mixture was heated to reflux temperature, and a solution of 30 ml. of concentrated aqueous hydrochloric acid in 30 ml. of absolute ethanol was added to the mixture over a period of about 1 hour. The temperature of the resulting mixture was maintained at about 60° C. for an additional two-hour period, after which the reaction mixture was allowed to remain at room temperature for a period of approximately 62 hours. The crystalline material which precipitated was redissolved by adding a small amount of methanol and warming. The residual zinc was removed by filtration, water was added to the filtered solution, and the material which precipitated was recovered by filtration. This product was recrystallized from methanol to give substantially pure $\Delta^{22}$-3,11-dihydroxy-ergostene which was obtained in the form of a white crystalline material; M. P. 153–154.5° C.

*Analysis.*—Calc'd for $C_{28}H_{48}O_2$: C, 80.71; H, 11.57. Found: C, 81.00; H, 11.68.

It is believed that these two isomers differ as a result of the stereochemical course of the reduction of the 11-keto group, the lower melting isomer hereinabove being, it is believed, $\Delta^{22}$-3-11β-dihydroxy-derivative and the higher melting isomer being the $\Delta^{22}$-3,11α-dihydroxy derivative. Both isomers are believed to differ also from the dihydroxy compound obtained in reductions using alkali metals in liquid ammonia and/or ethanol as a result of the stereochemical course of the $\Delta^8$-double bond reduction. Reductions utilizing sodium and ethanol, or employing sodium or lithium in ethanol and/or liquid ammonia give products which are believed to possess, at the juncture between rings B and C, the configuration C—8β, C—9α, whereas the present reduction operation (utilizing zinc) is believed to result mainly in the obtainment of the C—8α, C—9β isomeric configuration.

Oxidation of this compound with chromic acid in glacial acetic acid resulted in the production of the corresponding isomer of $\Delta^{22}$-3,11-diketo-ergostene; M. P. 163–164° C.

*Analysis.*—Calc'd. for $C_{28}H_{44}O_2$: C, 81.50; H, 10.73. Found: C, 81.41; H, 10.69;

$$\alpha_D^{25°\,C.} = \pm 0° \text{ (in chloroform)}$$

This isomer was not identical with the isomer obtained by the lithium-liquid ammonia-alcohol reduction of $\Delta^{8,22}$-3-acetoxy-11-keto-ergostadiene followed by chromic acid oxidation of the intermediate $\Delta^{22}$-3,11-dihydroxy-ergostene, as described in Example 3 hereinabove.

Example 7

Twenty grams of $\Delta^{8(9),22}$-3-acetoxy-11-keto-ergostadiene in 150 ml. dry ethyl ether were added with stirring to 2 liters of liquid ammonia. Twelve grams of freshly cut lithium were then added, and the reaction mixture was stirred at reflux temperature for a period of about six hours. One hundred and fifty milliliters of absolute ethanol was added to the reaction mixture over a period of 35 minutes. After all the ethanol had been added, the blue color due to dissolved lithium disappeared. Forty milliliters of water was added to the resulting mixture, and the ammonia was allowed to evaporate overnight through a mercury trap. The residual ethereal layer was separated, washed with water, dried over sodium sulfate, and the ether was evaporated therefrom in vacuo, leaving a crude white solid.

This solid was dissolved in ether, chromatographed over alumina and the alumina adsorbate was eluted, first with ether and then with a solution of 1% methanol in ether. From the ether eluate there was obtained crystalline $\Delta^{22}$-3-hydroxy-11-keto-ergostene, M. P. 166–168° C., $$(\alpha)_D^{25°\,C.} = +31° \text{ (CHCl}_3\text{)}$$

Calculated for $C_{28}H_{46}O_2$: Theory: C, 81.2; H, 11.20. Found: C, 81.10; H, 10.91.

From the 1% methanol in ether eluate there was obtained a small amount of $\Delta^{22}$-3,11-dihydroxy-ergostene, M. P. 164–165° C.

Example 8

To 1.8 liters of liquid ammonia was added dropwise, with stirring, 20.0 g. of $\Delta^{8(9),22}$-3-acetoxy-11-keto-ergostadiene in 170 ml. of dry ethyl ether. Twelve grams of freshly cut lithium was then added, and the reaction mixture was stirred for a period of 24 hours at a temperature of —34° C. to —60° C. Excess lithium was then decomposed by the dropwise addition of 100 ml. of ethyl acetate. Forty milliliters of water was then added to the reaction mixture and the ammonia was evaporated therefrom by warming the mixture to room temperature. The ethereal layer was separated, washed well with water, dried over sodium sulfate, and the ether evaporated therefrom in vacuo, leaving a crude white solid.

This crude white solid was dissolved in ether and chromatographed over alumina. The alumina absorbate was eluted first with ether and then with a solution of 1% methanol in ether. From the ether eluate there was obtained $\Delta^{22}$-3-acetoxy-11-keto-ergostene. The 1% methanol in either eluate yielded $\Delta^{22}$-3-hydroxy-11-keto-ergostene, M. P. 166–167° C.

The two compounds were combined, and the mixture was hydrolyzed by dissolving in alcoholic sodium hydroxide solution containing 2% sodium hydroxide and heating the solution under reflux for a period of 30 minutes. The reaction solution was diluted with water and the aqueous mixture was extracted with ether. The ethereal layer was washed with water, dried and the ether evaporated therefrom in vacuo to give, as the sole product, $\Delta^{22}$-3-hydroxy-11-keto-ergostene, M. P. 167–168° C., $$(\alpha)_D^{24°\,C.} = -28° \text{ (CHCl}_3\text{)}$$

Example 9

To 1.8 liters of liquid ammonia was added dropwise, with stirring, 20.0 g. of 8(9)-11-keto-dehydrotigogenin in dry ethyl ether. Twelve grams of freshly cut lithium was then added, and the reaction mixture was stirred for a period of 24 hours at a temperature of —34° C. to —60° C. Excess lithium was then decomposed by the dropwise addition of 100 ml. of ethyl acetate. Forty milliliters of water was then added to the reaction mixture, and the ammonia was evaporated therefrom by warming the mixture to room temperature. The ethereal layer was separated, washed well with water, dried over sodium sulfate, and the ether evaporated therefrom in vacuo, leaving a crude white solid.

The residue was refluxed with 2 liters of 1 M methyl alcoholic NaOH to convert the reduction product to 11-keto-tigogenin which was isolated in a substantially pure state by recrystallization from methanol, M. P. 226–8° C.;

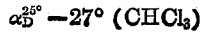

Example 10

A solution containing 2.5 g. of 8(9)-dehydro-11-keto-tigogenin in 100 cc. of dry ethyl ether was added to 500 cc. of liquid ammonia. After addition of 5 g. of freshly cut lithium, there was added dropwise 80 ml. of absolute ethanol over a period of 1 hour.

After the blue color of the solution had disappeared the reaction mixture was allowed to warm to room temperature, thereby effecting removal of the ammonia. The reaction mixture was diluted with water, extracted with ethyl ether and the ether extract evaporated to dryness. The residue of crude 11-hydroxy tigogenin was purified by chromatography over alumina to give substantially pure 11-hydroxy tigogenin.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting $\Delta^{8,22}$-3-acetoxy 11-keto-ergostadiene with metallic lithium in a medium comprising liquid ammonia and ethanol, thereby forming $\Delta^{22}$-3,11-dihydroxy-ergostene and reacting said $\Delta^{22}$-3,11-dihydroxy-ergostene with chromium trioxide to form $\Delta^{22}$-3,11-diketo-ergostene.

2. The process which comprises reacting $\Delta^{8,22}$-3-acetoxy-11-keto-ergostadiene with lithium in a modium comprising liquid ammonia and ethanol, thereby producing a mixture of $\Delta^{22}$-3,11-dihydroxy-ergostene and $\Delta^{22}$-3-acetoxy-11-hydroxy-ergostene.

3. The process which comprises reacting $\Delta^{8,22}$-3-acetoxy-11-keto-ergostadiene with sodium in liquid ammonia and ethanol, thereby producing $\Delta^{22}$-3,11-dihydroxy-ergostene.

4. The process which comprises reacting $\Delta^{22}$-3,11-dihydroxy ergostene with substantially one equivalent of chromic acid to produce $\Delta^{22}$-3-hydroxy-11-keto-ergostene.

5. $\Delta^{22}$-3-acetoxy-11-hydroxy-ergostene.

6. $\Delta^{22}$-3,11-dihydroxy-ergostene.

7. $\Delta^{22}$-3,11-diketo-ergostene.

References Cited in the file of this patent

UNITED STATES PATENTS 2,602,769    Murray _____ July 8, 1952

OTHER REFERENCES

Chamberlin et al.: Jour. Am. Chem. Soc. 73, 2396–2397. (Received Apr. 26, 1951.)

Fiesser et al.: Natural Products Related to Phenanthrene, 3rd ed., 418, 421, 425 (1949).